(12) United States Patent
Lee et al.

(10) Patent No.: US 9,653,979 B2
(45) Date of Patent: May 16, 2017

(54) MULTIDIRECTIONAL VIBRATION GENERATOR USING SINGLE VIBRATOR AND METHOD FOR THE SAME

(71) Applicant: KOREA INSTITUTE OF SCIENCE AND TECHNOLOGY, Seoul (KR)

(72) Inventors: Sungon Lee, Seoul (KR); Jun Woo Kim, Seongnam-si (KR); Sang Rok Oh, Seoul (KR)

(73) Assignee: Korea Insitute of Science and Technology, Seoul (KR)

( * ) Notice: Subject to any disclaimer, the term of this patent is extended or adjusted under 35 U.S.C. 154(b) by 570 days.

(21) Appl. No.: 14/325,899

(22) Filed: Jul. 8, 2014

(65) Prior Publication Data

US 2015/0015117 A1    Jan. 15, 2015

(30) Foreign Application Priority Data

Jul. 9, 2013  (KR) ......................... 10-2013-0080361

(51) Int. Cl.
| | | |
|---|---|---|
| *H02N 2/00* | (2006.01) | |
| *B06B 1/00* | (2006.01) | |
| *H02K 33/00* | (2006.01) | |
| *H02K 7/14* | (2006.01) | |
| *B06B 1/04* | (2006.01) | |
| *B06B 1/10* | (2006.01) | |

(52) U.S. Cl.
CPC .............. *H02K 33/00* (2013.01); *B06B 1/04* (2013.01); *B06B 1/10* (2013.01); *H02K 7/14* (2013.01)

(58) Field of Classification Search
USPC .................................. 310/81, 323.01–323.21
See application file for complete search history.

(56) References Cited

U.S. PATENT DOCUMENTS 4,302,709 A * 11/1981 Tichtinsky ........... G02B 7/1821
                                                            310/321
8,698,759 B2   4/2014 Shin
(Continued)

FOREIGN PATENT DOCUMENTS

| JP | 2004-258851 A | * 9/2004 | ............ G06F 3/033 |
| JP | 3984630 B2 | 7/2007 | |
| JP | 2010-94567 A | * 4/2010 | ............... B06B 1/04 |

(Continued)

OTHER PUBLICATIONS

Tappeiner, H. W., Klatzky, R. L., Unger, B., & Hollis, R. (Mar. 2009). "Good Vibrations: Asymmetric Vibrations for Directional Haptic Cues." In EuroHaptics conference, 2009 and Symposium on Haptic Interfaces for Virtual Environment and Teleoperator Systems. World Haptics 2009. Third Joint (pp. 285-289). IEEE.

(Continued)

*Primary Examiner* — Thomas Dougherty
(74) *Attorney, Agent, or Firm* — NSIP Law

(57) ABSTRACT

Disclosed is a vibration generating method includes providing a vibration generating device which receives a driving power and generates a vibration, and controlling vibration of a vibrator of the vibration generating device, wherein the vibration of the vibrator is controlled by systematizing an inertia matrix and a stiffness matrix of the vibrator, and wherein the inertia matrix and the stiffness matrix simultaneously satisfy diagonalization. A vibration generating device using this method is also disclosed.

7 Claims, 10 Drawing Sheets

(56) References Cited

U.S. PATENT DOCUMENTS

2012/0025742 A1* 2/2012 Masahiko ............. B06B 1/0207
                                                              318/114
2013/0243534 A1* 9/2013 Steffen .................... E02D 3/068
                                                              405/271

FOREIGN PATENT DOCUMENTS

| KR | 10-2010-0104975 A | 9/2010 |
| KR | 10-1097782 B1 | 12/2011 |
| KR | 10-2013-0010591 A | 1/2013 |

OTHER PUBLICATIONS

Gleeson, Brian T., Scott K. Horschel, and William R. Provancher. "Design of a Fingertip-Mounted Tactile Display with Tangential Skin Displacement Feedback." IEEE Transactions on Haptics, vol. 3., No. 4 (Oct.-Dec. 2010): pp. 297-301.

Seon Jun Jang "Multi-Body Vibration Analysis Using Screw Theory and Transfer Matrix Method" Dept. of Mechanical Engineering, The Graduate School Yonsei University, (Jul. 7, 2001) 103 pages (in Korean with English Abstract).

* cited by examiner

MULTIDIRECTIONAL VIBRATION GENERATOR USING SINGLE VIBRATOR AND METHOD FOR THE SAME

CROSS-REFERENCE TO RELATED APPLICATION

This application claims priority to Korean Patent Application No. 10-2013-0080361, filed on Jul. 9, 2013, and all the benefits accruing therefrom under 35 U.S.C. §119, the contents of which in its entirety are herein incorporated by reference.

BACKGROUND

1. Field

The present disclosure relates to a multidirectional vibration generator using a single vibrator and its vibration generating method, and more particularly, to a single vibrator multidirectional vibration haptic feedback device giving a vibration effect with multidirectional frequencies according to a frequency of a driving source and a method for giving a haptic effect using a single vibrator.

2. Description of the Related Art

Generally, haptic feedback allows a user to feel sense of touch, force, motion or the like by means of a keyboard, a mouse, a joystick, a touch screen or the like. In particular, the technique in relation to touch feedback using the sense of touch on the skin may be relatively easily implemented, and this is widely applied to touch control interfaces of portable devices such as cellular phones, PDA or the like. In addition, the touch feedback improves the feeling of manipulation to a device and also gives the sense of reality and immersion to a user, and thus various techniques capable of implementing various kinds of touches are being developed.

In this tendency, many attempts are being made to diversify vibration effects of a vibration generating device, and particularly it is needed to develop a multi-mode vibration generating device capable of giving vibrations having a plurality of frequencies to a vibration generating device.

FIG. 9 shows an example of a general haptic feedback device. The general haptic feedback device depicted in FIG. 9 uses four vibrators 201, 202, 203, 204. If a specific point 200 is touched by a user, a width 211, 212 and a height 213, 214 are measured and calculated based on the touched specific point 200, so that the vibrators 201, 202, 203, 204 have different values depending on a touched location.

However, this device uses a plurality of vibrators 201, 202, 203, 204, and thus it is difficult to design the entire device or system in a small size.

In addition, FIG. 10 shows another example of a general haptic feedback device. The haptic feedback device depicted in FIG. 10 includes an input unit 301, a control unit 304, a vibrator driving unit 305, a first vibrator 302, and a second vibrator 303. The first vibrator 302 and the second vibrator 303 may vibrate to generate a vibration stimulus when a driving signal of the vibrator driving unit 305 varies.

Moreover, in this device, vibration stimuli generated at specific frequencies of first and second vibrators are synthetically exhibited as shown in FIG. 11. In other words, the synthetic vibration of the first vibrator 302 and the second vibrator 303 are shown as the sum of vibrations of a vibration frequency having an absolute value (|f1-f2|) which is a difference between a first vibration frequency (f1) and a second vibration frequency (f2) and vibrations of a frequency having a mean value ((f1+f2)/2) of the first vibration frequency (f1) and the second vibration frequency (f2).

However, as shown in FIG. 11, in this device, a vibration desired by a user may not be easily generated other than the vibrations of a vibration frequency having an absolute value (|f1-f2|) which is a difference between the first vibration frequency (f1) and the second vibration frequency (f2) and the vibrations of a frequency having a mean value ((f1+f2)/2) of the first vibration frequency (f1) and the second vibration frequency (f2), and even though vibrations are generated, their magnitudes are very small.

In addition, since two vibrators are used as described above, it is still difficult to design the entire device or system in a small size.

Next, FIG. 12 shows another example of a general haptic feedback device, which particularly includes a single vibration driving unit. In other words, this device includes an electromagnetic circuit 404 for receiving a driving power and generating an electromagnetic force, a driving unit 403 disposed at an upper portion of the electromagnetic circuit to vibrate in a plurality of vibration frequencies according to the frequency of the driving power, and a case unit 400 surrounding the electromagnetic circuit and the driving unit.

However, this device also includes two vibration modes (for example, an x-axis mode and a y-axis mode) having different inherent vibration frequencies f1 and f2 as shown in FIG. 13 so that a vibration effect is implemented with a waveform where f1 and f2 are synthesized. In addition, a vibration desired by a user may not be easily generated other than the inherent vibration frequencies, and even though vibrations are generated, their magnitudes are very small.

RELATED LITERATURES

Patent Literature

1. Korean Unexamined Patent Publication No. 10-2010-0104975
2. Korean Patent Registration No. 10-1097782
3. Korean Unexamined Patent Publication No. 10-2013-0010591

SUMMARY

The present disclosure is directed to providing a multidirectional vibration generator using a single vibrator and its vibration generating method, which allows a small design and may generate a vibratory motion in a desired direction just by changing a frequency using the single vibrator.

The present disclosure is also directed to providing a multidirectional vibration generator using a single vibrator and its vibration generating method, which may generate a vibratory motion in a desired form not only at resonance points but also in a frequency band therebetween by directly designing a system having a desired resonance frequency and locating two or more resonance frequencies at desired locations, and also may generate a uniform amplitude even in a driving frequency band.

In one aspect, there is provided a vibration generating method, which includes: providing a vibration generating device which receives a driving power and generates a vibration; and controlling vibration of a vibrator of the vibration generating device, wherein the vibration of the vibrator is controlled by systematizing an inertia matrix and a stiffness matrix of the vibrator, and wherein the inertia matrix and the stiffness matrix simultaneously satisfy diagonalization.

In addition, the vibration generating device may be a 4-bar mechanism spring damper systems disposed at both sides of the vibrator in parallel in a vertical direction, vertical distances from a center of the vibrator to the upper spring damper system and the lower spring damper system may be identical, and a spring constant (k1) of the upper spring damper system may be identical to a spring constant (k2) of the lower spring damper system.

In addition, a vibration frequency ($\omega$) of the vibrator may be determined, and a motion of the vibrator may be determined by designing spring constants and vertical distances of the upper and lower spring damper systems.

In addition, the vibrator of the vibration generating device may be a single vibrator.

In addition, a vertical spring damper system may be added to a lower portion of the center of the vibrator, and the 4-bar mechanism may be replaced with an eccentric motor or a piezoelectric vibration body.

In another aspect, there is provided a vibration generating device for receiving a driving power and generating a vibration by means of an electromagnetic force, which includes: a motor for generating a power with the received driving power; a vibrator connected to a vibration frame connected to the motor to vibrate according to a frequency of the motor; and a plurality of spring damper systems disposed at both sides of the vibrator, wherein the vibration generating device uses the vibration generating method defined in the claim 1.

In the present disclosure, a vibration device or system capable of generating a vibratory motion in a desired direction just by changing a frequency using the single vibrator may be designed in a small size.

In addition, since the present disclosure is based on the analytical designing technique and does not use a resonance frequency obtained through interpretation, a system having a desired resonance frequency may be directly designed.

In addition, in the present disclosure, two or more resonance frequencies may be located at desired locations, so that a vibratory motion in a desired form may be generated not only at resonance points but also in a frequency band therebetween, and a uniform amplitude may be generated in a driving frequency band.

In addition, since the vibration generating device of the present disclosure may widen an available frequency band by obtaining a vibratory motion in a desired form with an uniform amplitude even in a frequency band between resonance points, linearity of the change of a motion direction according to the change of frequency greatly increases, easier control is ensured, and the performance of the vibration generating device may be improved.

In addition, since the vibration generating device of the present disclosure implements multidirectional vibrations by driving a single vibrator and just needs a simple speed control system, the present disclosure may be a great help in reducing a size of a haptic device of mobile terminals or game consoles which require the transfer of various touches.

DETAILED DESCRIPTION

Hereinafter, a multidirectional vibration generator using a single vibrator and its vibration generating method according to an embodiment of the present disclosure will be described through preferred embodiments.

Prior to description, in various embodiments, components having the same configuration is endowed with the same reference sign and representatively explained in one embodiment, and other components will be described in other embodiments.

Figure 1:
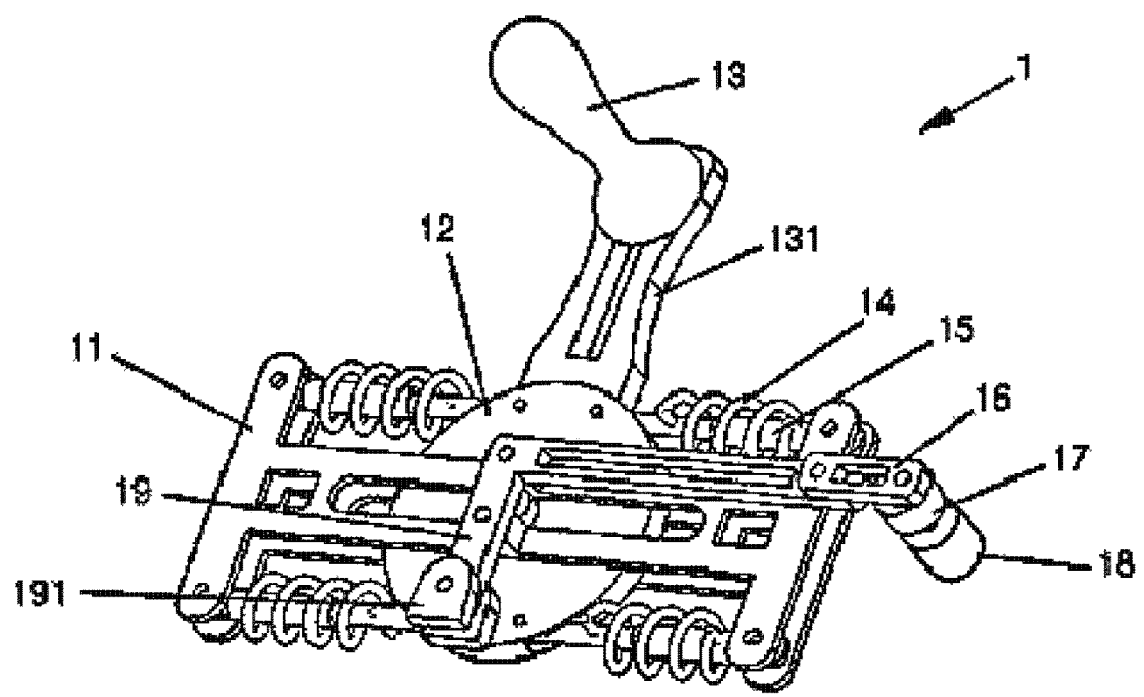
FIG. 1 is a perspective view schematically showing a vibration generating device according to an embodiment of the present disclosure.

FIG. 1 is a perspective view schematically showing a vibration generating device 1 according to an embodiment of the present disclosure. As shown in FIG. 1, it may be understood that the vibration generating device 1 of the present disclosure receives a driving force of a motor 18 so that a vibrator 12 vibrates, and the vibration is output through an output unit 13.

In more detail, a frequency in a desired vibration direction is determined by a controller (not shown), and a control signal is sent to the motor 18 through an amplifier (not shown). As shown in FIG. 1, in the motor 18, a crank 17, a coupler 16, and a rocker 19 are mechanically connected in order. If the motor 18 is driven through the control signal, the vibration of the motor vibrates the crank 17, the coupler 16, and the rocker 19 in order.

In addition, the rocker 19 is mechanically connected to a vibration frame 11 through a rocker fixing unit 191, and as a result, the vibration initiated from the motor 18 vibrates the vibration frame 11.

A vibrator 12 is disposed at a center of the vibration frame 11, and the vibrator 12 is mechanically connected to the vibration frame 11 through a spring 14 and a damper 15 mechanically connected to both side ends of the vibrator. In an embodiment of the present disclosure, the spring and damper 14, 15 use two springs and dampers at one side, respectively for upper and lower portions, namely four springs and dampers 14, 15 in total. In addition, even though an embodiment of the present disclosure employs the motor 18 and the vibrator 12 connected to four springs and dampers 14, 15, a person skilled in the art may also use other kinds of vibration generating mechanisms, for example an eccentric motor or a piezoelectric vibrator.

As described above, the vibration of the vibration frame 11 is transferred to the vibrator 12 through the spring 14 and the damper 15. Here, the spring 14 and the damper 15 may be made of elastic material capable of transferring the vibration of the vibration frame 11 to the vibrator 12, without being limited thereto.

At this time, the vibration of the vibrator 12 is made by means of an external force transferred through the spring 14 and the damper 15, and the vibration of the vibrator 12 is generated according to a frequency response characteristic with respect to a force component.

In addition, the vibration of the vibrator 12 is transferred to the output unit 13 through an output connection unit 131, and a user finally feels the vibration through the output unit 13.

Figure 2:
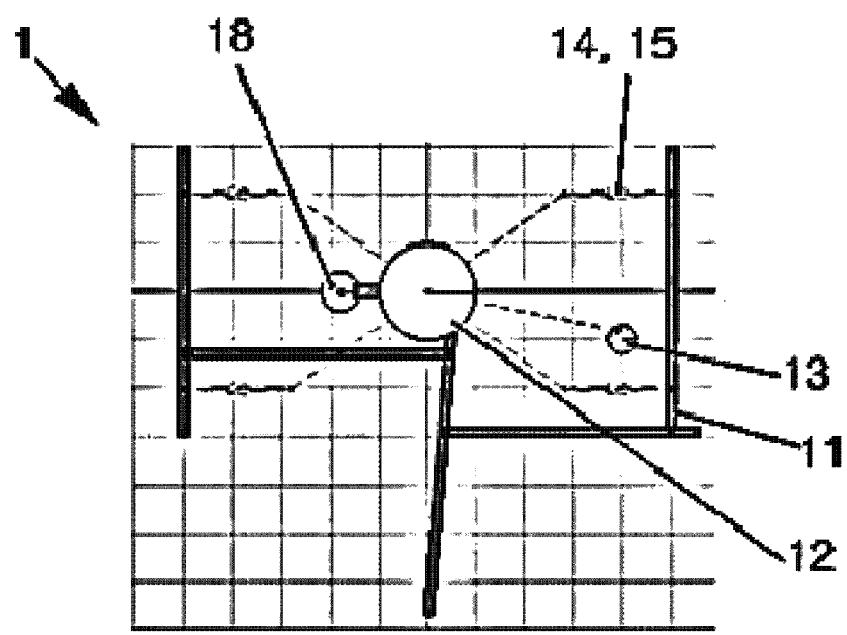
FIG. 2 is a systemically modeled diagram schematically showing the vibration generating device depicted in FIG. 1.

FIG. 2 is a systemically modeled diagram schematically showing the vibration generating device depicted in FIG. 1, and as essential components of the vibration generating device 1 of the present disclosure, only the vibration frame 11, the vibrator 12, the output unit 13, the spring and damper 14, 15, and the motor 18 are depicted schematically.

Figure 3:
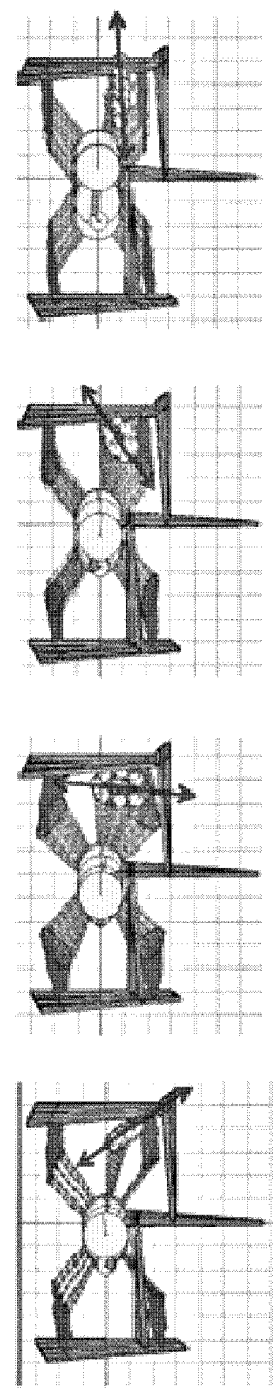
FIG. 3 is a diagram schematically showing a vibration direction according to each vibration frequency of the vibration generating device depicted in FIGS. 1 and 2.

In addition, FIG. 3 is a diagram schematically showing a vibration direction or the like according to each vibration frequency of the vibration generating device depicted in FIGS. 1 and 2. As shown in FIG. 3, in the vibration generating device according to an embodiment of the present disclosure, different vibration directions of the output unit 13 were observed when the frequency of the motor 18 was changed to 3.98 Hz, 4.93 Hz, 5.41 Hz, and 7.00 Hz, respectively.

Figure 4:
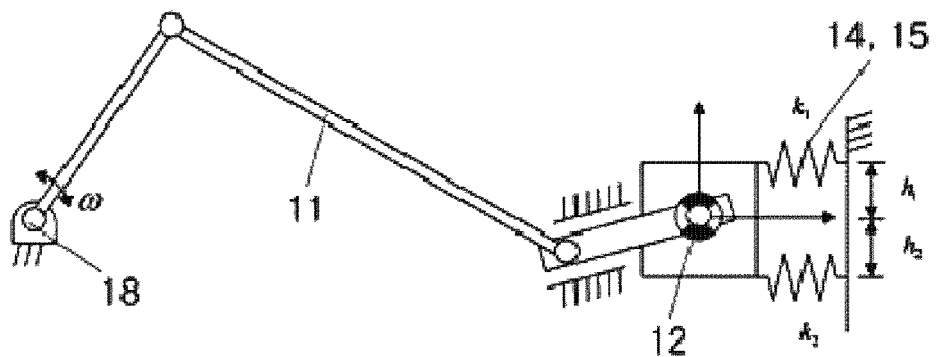
FIG. 4 is a diagram schematically showing a concept of the vibration generating device depicted in FIGS. 1 and 2.

FIG. 4 is a diagram schematically showing a mathematical concept of the vibration generating device depicted in FIGS. 1 and 2. For easier explanation, among the entire components of the vibration generating device 1, the motor 18, the vibration frame 11, and the vibrator 12 are depicted, and the spring and damper 14, 15 are depicted as physical symbols used in the art.

Here, the vibration frequency of the motor 18 is marked as "ω", elastic modulus of the upper and lower springs and dampers 14, 15 are marked as "$k_1$", "$k_2$", respectively, and the mass and the moment of inertia of the vibrator 12 are marked as "m" and "j", respectively. In addition, a vertical distance from the center of the vibrator 12 to the upper spring and damper is marked as "$h_1$", and a vertical distance to the lower spring and damper is marked as "$h_2$".

The inertia matrix and the stiffness matrix through this system may be expressed as follows.

$$M = \begin{bmatrix} m & 0 & 0 \\ 0 & m & 0 \\ 0 & 0 & j \end{bmatrix},$$ [Equation 1]

$$K = \begin{bmatrix} k_1 + k_2 & 0 & h_1 k_1 + h_2 k_2 \\ 0 & 0 & 0 \\ h_1 k_1 + h_2 k_2 & 0 & h_1^2 k_1 + h_2^2 k_2 \end{bmatrix}$$

Here, assuming that "$k_1 = k_2$", "$h_2 = -h_1$", an inherent vibration frequency and a mode vector of this system may be obtained as follows.

TABLE 1

| | Inherent frequency | Mode vector |
|---|---|---|
| Mode 1 | $\omega_1^2 = \dfrac{2kh^2}{j}$ | $\hat{x}_1 = [0\ 0\ 1]^T$ |
| Mode 2 | $\omega_2^2 = \dfrac{2k}{m}$ | $\hat{x}_2 = [1\ 0\ 0]^T$ |

In addition, in [Table 1], the stiffness and installation locations of the spring and damper 14, 15 may be determined by setting desired "1" and "2" and deciding "k" and "h" satisfying them.

The system designed in this way may be calculated using [Equation 2] below as the vibration frequency of the vibrator 12 varies.

$$\delta \hat{X} = \sum_{y=1}^{2} \frac{\hat{X}_y^T \delta \hat{\omega}_{ext}}{(\tilde{k}_y - \tilde{m}_y \Omega^2) + i(\tilde{c}_y \Omega)} \hat{X}_y$$ [Equation 2]

$$= \begin{bmatrix} \dfrac{2kp}{(2k - m\Omega^2) + i(2c\Omega)} \\ \dfrac{2kh^2}{(2kh^2 - j\Omega^2) + i(2ch^2\Omega)} \end{bmatrix}$$

Here, "p" means a y coordinate of the rocker fixing unit 191.

Figure 5:
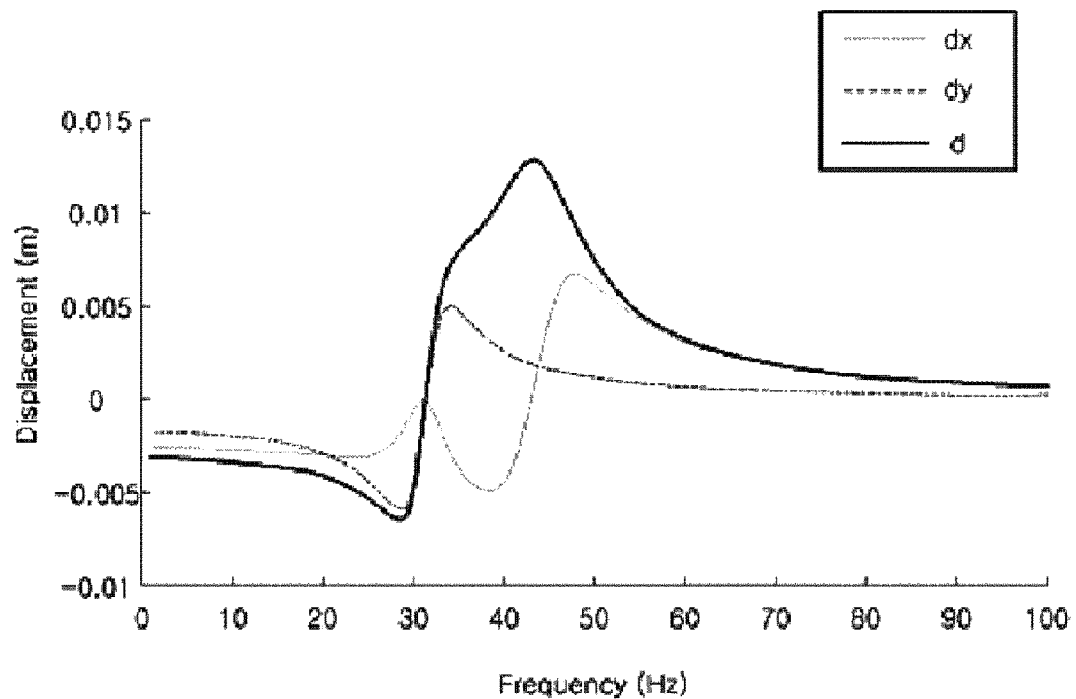
FIG. 5 is a graph showing a displacement motion according to the change of frequency of a vibrator in the vibration generating device depicted in FIGS. 1 and 2.

In addition, FIG. 5 is a graph showing a displacement motion according to the change of frequency of a vibrator through [Equation 1], [Equation 2] and [Table 1] in the vibration generating device depicted in FIGS. 1 and 2. As shown in FIG. 5, a displacement "dx" along an x-axis and a displacement "dy" along a y-axis are synthesized to exhibit an entire displacement "d". In addition, as shown in FIG. 5, it may be found that a vibratory motion is exhibited not only at resonance points but also in a frequency band between them, and it may also be found that a uniform amplitude is observed in the entire driving frequency band.

Therefore, it may be understood that a band width of the vibration generating device according to an embodiment of the present disclosure is greatly improved.

Figure 6:
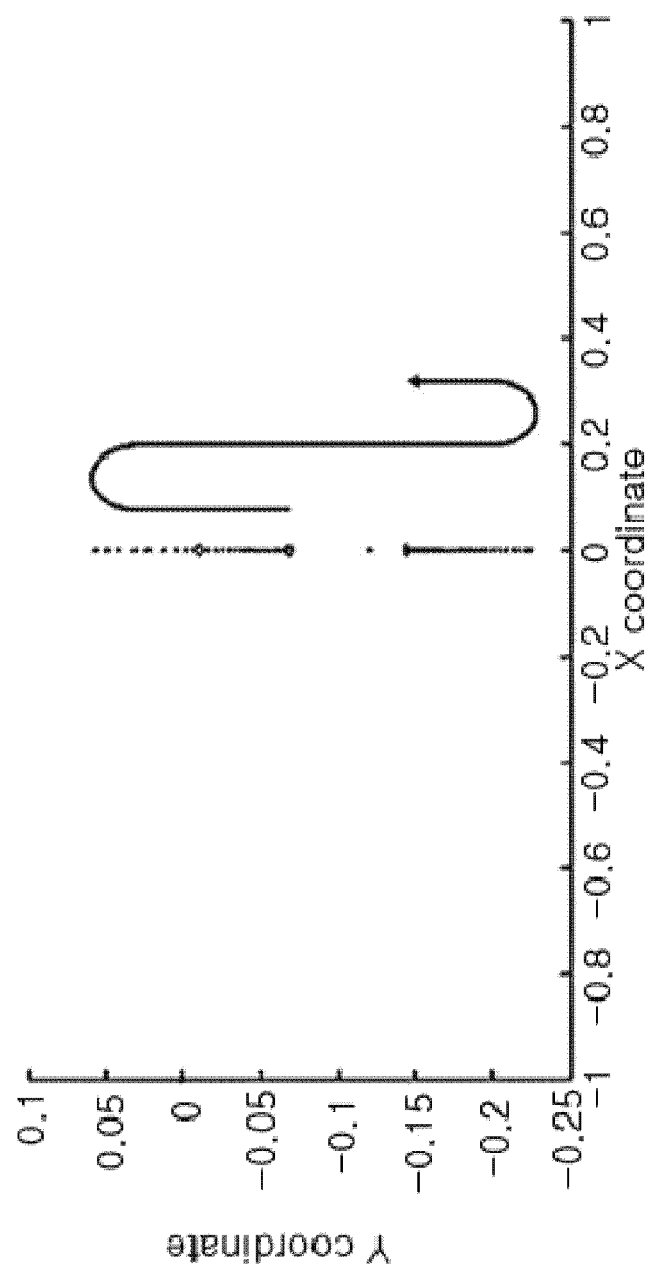
FIG. 6 is a graph showing the change of a vibration center point according to the increase of a driving frequency of the vibration generating device depicted in FIGS. 1 and 2.

In addition, FIG. 6 is a graph showing the change of a vibration center point according to the increase of a driving frequency of the vibration generating device depicted in FIGS. 1 and 2. As shown in FIG. 6, it may be found that as the driving frequency of the vibration generating device increases, a vibration center moves along a y-axis where x=0 in an up-down-up pattern.

Figure 7:
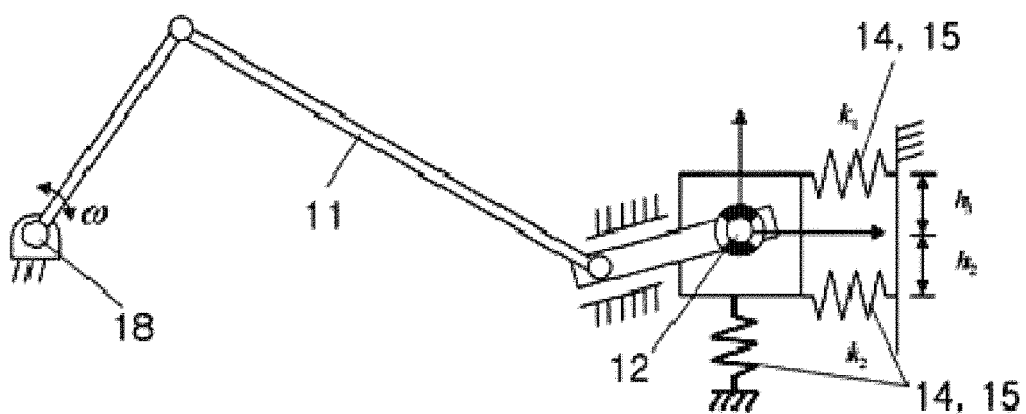
FIG. 7 is a diagram schematically showing a vibration generating device according to another embodiment of the present disclosure.

FIG. 7 is a diagram schematically showing a vibration generating device according to another embodiment of the present disclosure. As shown in FIG. 7, in another embodiment of the present disclosure, a spring is added to a lower portion of the vibrator 12 along a y-axis.

In addition, the stiffness "$k_3$" of the added spring may be determined to satisfy the following equation in consideration of a third frequency "$\omega_3$" to be designed.

$$\omega_3^2 = \frac{2k}{m}$$ [Equation 3]

Figure 8:
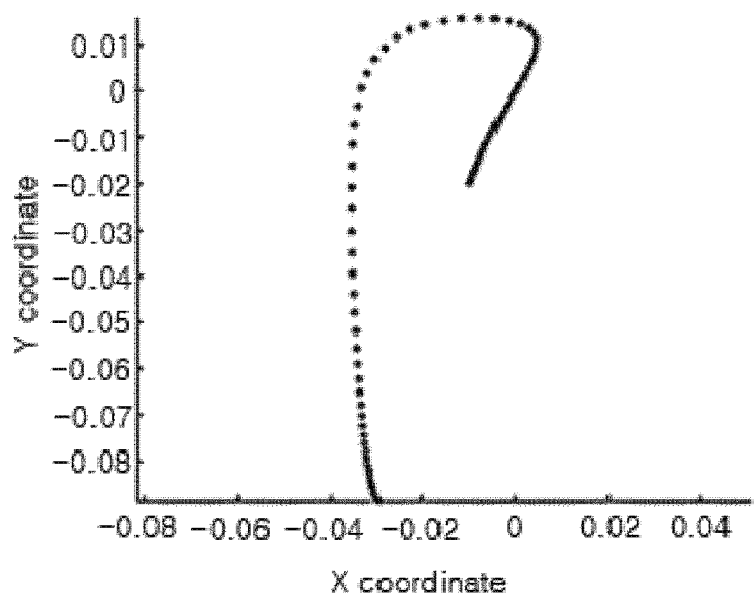
FIG. 8 is a graph showing the change of a vibration center point according to the increase of a driving frequency of a vibrator in the vibration generating device another embodiment of the present disclosure depicted in FIG. 7.
Figure 9:
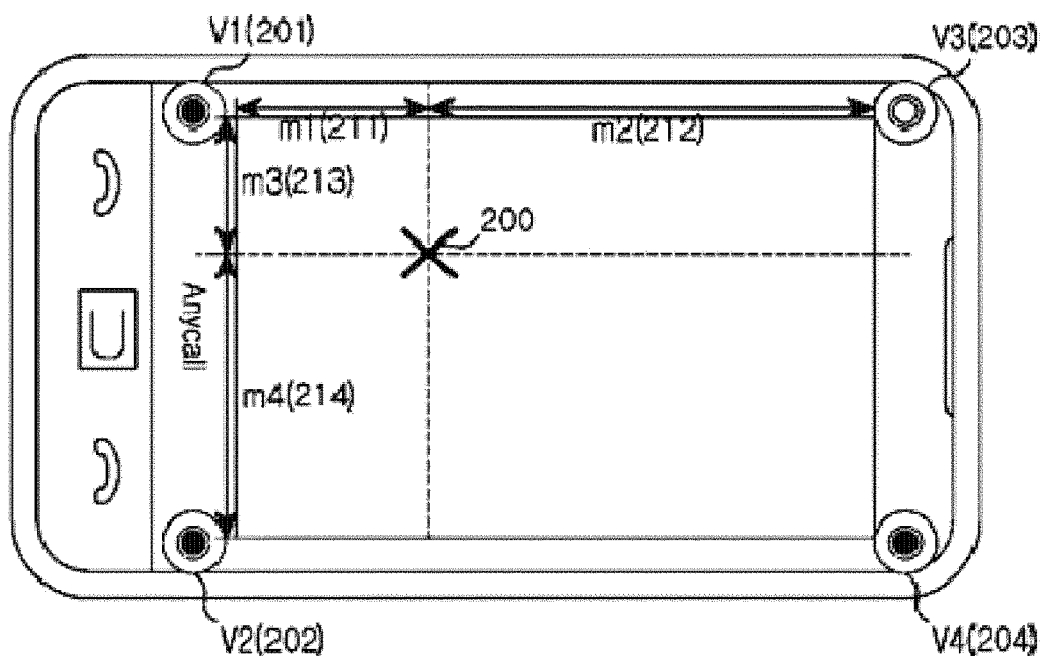
FIG. 9 is a diagram schematically showing an example of a general haptic feedback device.
Figure 10:
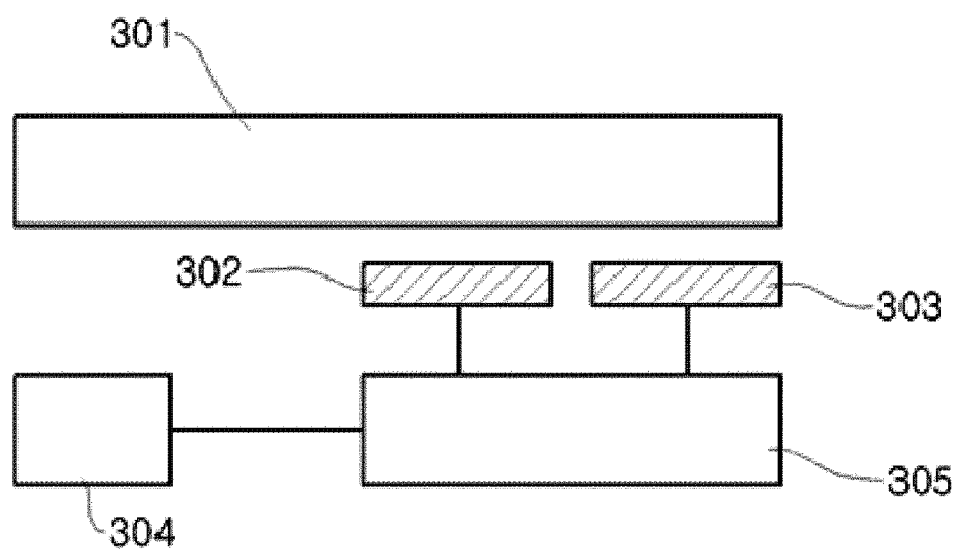
FIG. 10 is a diagram schematically showing another example of a general haptic feedback device.
Figure 11:
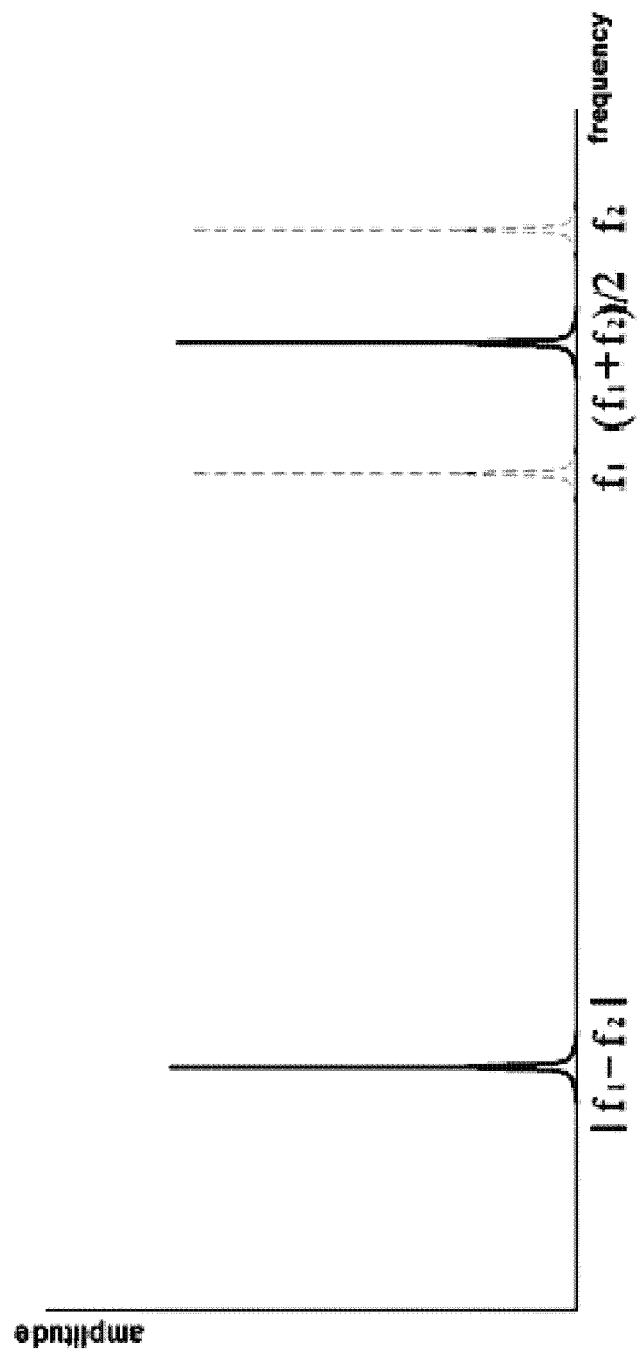
FIG. 11 is a graph showing that vibration stimuli of vibrators of the general haptic feedback device depicted in FIG. 10 are synthesized.
Figure 12:
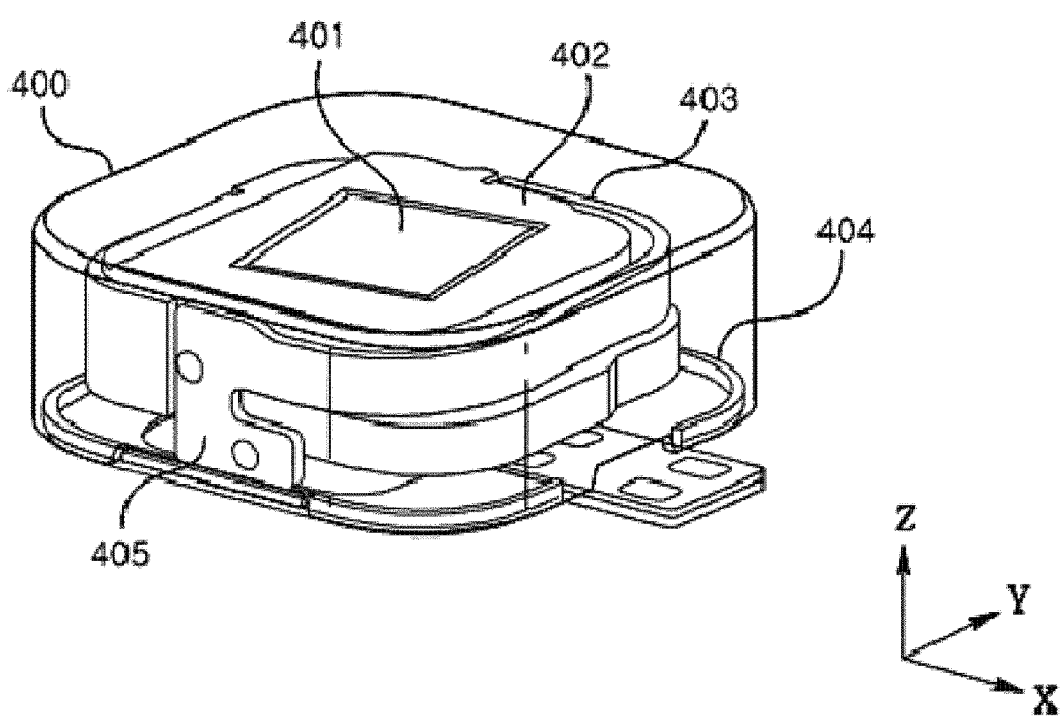
FIG. 12 is a perspective view showing a haptic feedback device including a single vibration driving unit according to another example of a general haptic feedback device.
Figure 13:
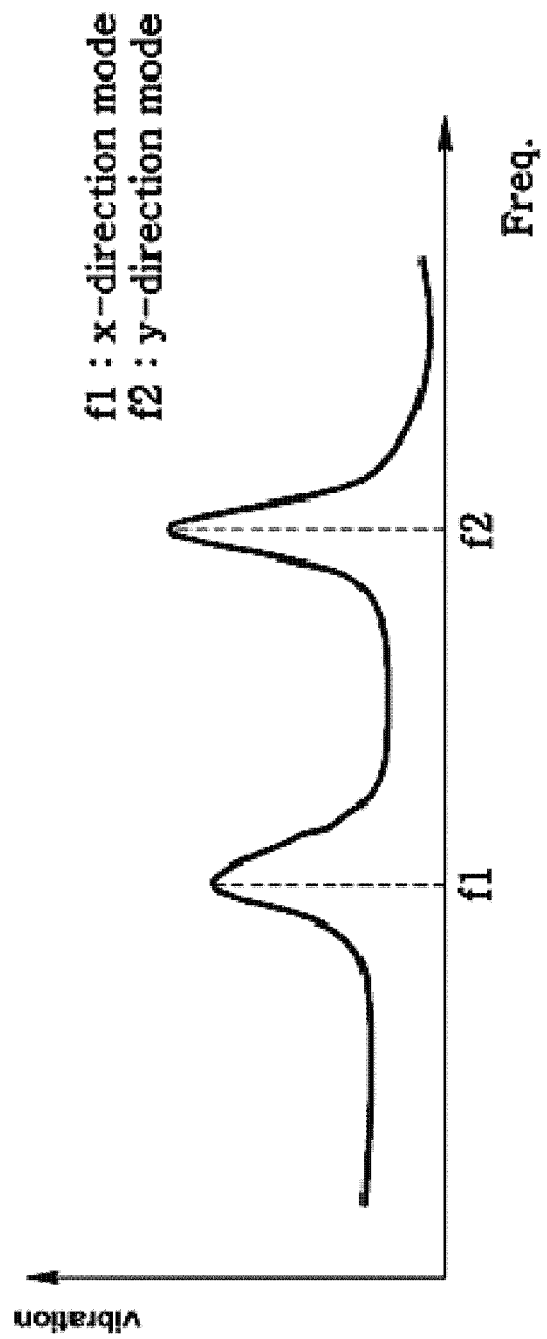
FIG. 13 is a graph showing that a vibration stimulus according to each vibration frequency of the general haptic feedback device depicted in FIG. 12.

The change of a vibration center point according to another embodiment of the present disclosure is depicted in FIG. 8. As shown in FIG. 8, it may be understood that three vibration modes are used in another embodiment of the present disclosure, and more various vibration patterns are available with respect to a wide frequency band.

As described above, it will be understood by those skilled in the art that the present disclosure may be modified in various ways without changing its technical aspect or essential features.

Therefore, it should be understood that all the above embodiments are just for illustration only, not intended to limit the present disclosure, and the scope of the present disclosure is defined by the appended claims rather than the above detailed description. In addition, all changes or modifications derived from the meaning and range of the claims and their equivalents should be interpreted as falling within the scope of the present disclosure.

REFERENCE SIGNS 1 vibration generating device
11 vibration frame
12 vibrator
13 output unit
131 output connection unit
14 spring
15 damper
16 coupler
17 crank
18 motor
19 rocker
191 rocker fixing unit

What is claimed is:

1. A vibration generating method, comprising:
   providing a vibration generating device which receives a driving power and generates a vibration; and
   controlling vibration of a vibrator of the vibration generating device,
   wherein the vibration of the vibrator is controlled by systematizing an inertia matrix and a stiffness matrix of the vibrator, and
   wherein the inertia matrix and the stiffness matrix simultaneously satisfy diagonalization.

2. The vibration generating method according to claim 1,
   wherein the vibration generating device is a 4-bar mechanism spring damper systems are disposed at both sides of the vibrator in parallel in a vertical direction,
   wherein vertical distances from a center of the vibrator to the upper spring damper system and the lower spring damper system are identical, and
   wherein a spring constant ($k_1$) of the upper spring damper system is identical to a spring constant ($k_2$) of the lower spring damper system.

3. The vibration generating method according to claim 1,
   wherein a vibration frequency (w) of the vibrator is determined, and
   wherein a motion of the vibrator is determined by designing spring constants and vertical distances of the upper and lower spring damper systems.

4. The vibration generating method according to claim 1,
   wherein the vibrator of the vibration generating device is a single vibrator.

5. The vibration generating method according to claim 1,
   wherein a vertical spring damper system is added to a lower portion of the center of the vibrator.

6. The vibration generating method according to claim 2,
   wherein the 4-bar mechanism is replaced with an eccentric motor or a piezoelectric vibration body.

7. A vibration generating device for receiving a driving power and generating a vibration by means of an electromagnetic force, the vibration generating device comprising:
   a motor for generating a power with the received driving power;
   a vibrator connected to a vibration frame connected to the motor to vibrate according to a frequency of the motor; and
   a plurality of spring damper systems disposed at both sides of the vibrator,
   wherein the vibration generating device uses the vibration generating method defined in the claim 1.

* * * * *